(12) United States Patent  
Koike

(10) Patent No.: US 7,592,042 B1  
(45) Date of Patent: Sep. 22, 2009

(54) REVERSE MICELLE METHOD OF PRODUCING CORE/SHELL PARTICLES

(75) Inventor: Takashi Koike, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 213 days.

(21) Appl. No.: 11/641,004

(22) Filed: Dec. 19, 2006

(30) Foreign Application Priority Data

Dec. 19, 2005 (JP) .............................. 2005-365301

(51) Int. Cl.
*B05D 3/02* (2006.01)
*B05D 3/10* (2006.01)
*B05D 7/00* (2006.01)
*B32B 5/16* (2006.01)

(52) U.S. Cl. ...................... 427/215; 427/216; 427/220; 427/372.2; 427/384

(58) Field of Classification Search ................. 427/212, 427/215, 216, 220, 372.2, 384
See application file for complete search history.

(56) References Cited

U.S. PATENT DOCUMENTS

| 7,053,021 | B1 * | 5/2006 | Zhong et al. ................. 502/185 |
| 7,255,735 | B2 * | 8/2007 | Meyer et al. ................. 106/445 |
| 7,335,245 | B2 * | 2/2008 | He et al. ........................ 75/351 |
| 2004/0167257 | A1 * | 8/2004 | Ryang ........................ 524/262 |

FOREIGN PATENT DOCUMENTS

| JP | 2003-132519 A | 5/2003 |
| JP | 2003-217108 A | 7/2003 |
| JP | 2003-533363 A | 11/2003 |

* cited by examiner

*Primary Examiner*—H. (Holly) T Le
(74) *Attorney, Agent, or Firm*—Sughrue Mion, PLLC

(57) ABSTRACT

A core/shell particle which includes a core component that contains a metal, and a shell component that coats the core component, the shell component including a a hydrolysate and/or a partial condensate of a compound represented by the formula "$(R)_m\text{---}A(X)_{4-m}$", wherein R represents a substituted or unsubstituted alkyl group or the like, A represents Si or Ti, X represents a hydroxyl group or the like, and m represents an integer of 1 to 3. Furthermore, a method of producing a core/shell particle is provided.

2 Claims, No Drawings

… … …

REVERSE MICELLE METHOD OF PRODUCING CORE/SHELL PARTICLES

CROSS-REFERENCE TO RELATED APPLICATION

This application claims priority under 35 USC 119 from Japanese Patent Application No. 2005-365301, the disclosure of which is incorporated by reference herein.

BACKGROUND OF THE INVENTION

1. Technical Field

The present invention relates to a nanoparticle and a method of producing the nanoparticle, and in particular, relates to a core/shell particle and a method of producing the same.

2. Description of the Related Art

Techniques of coating a material for a core with a material for a shell in order to protect a chemically or physically unstable material, or give special functions thereto, are known. Particles manufactured by such techniques are generally called core/shell particles.

Many applications of core/shell particles are known, such as silver halide particles for photographic photosensitive materials and silicone elastomer particles in a thermosetting resin. In recent years, core/shell particles as applied to magnetic particles, especially magnetic particles in magnetic recording media, have attracted significant attention.

Miniaturization and advances in performance of magnetic recording media for computers such as magnetic tapes and magnetic discs have been progressing due to densification of recording capacity. Accompanying this, reduction in particle size of magnetic substances has also been progressing. Among ferromagnetic materials having the same mass, ones having a smaller particle size can achieve lower noise.

For example, CuAu type and/or $Cu_3Au$ type ferromagnetic ordered alloys are promising materials for improving magnetic recording density because they have great crystal magnetic anisotropy due to distortion that occurs in ordering, and thus exhibit ferromagnetism even when their particle size is reduced to a state that is generally referred to as a nanoparticle.

Metal nanoparticles can be produced by a liquid phase method. As the liquid phase method, various methods which have been conventionally known can be employed. Examples of the liquid phase method include, according to classification by the precipitation method, (1) alcohol reduction methods in which a primary alcohol is used, (2) polyol reduction methods in which a secondary, tertiary, dihydric or trihydric alcohol is used, (3) thermal decomposition methods, (4) ultrasonic decomposition methods, (5) reduction methods with a potent reducing agent, and the like. Furthermore, according to classification based on reaction systems, examples of the liquid phase method include (6) polymer existence methods, (7) high-boiling point solvent methods, (8) regular micelle methods, (9) reverse micelle methods and the like. As the liquid phase method, a reduction method established by improvement of these methods is preferably employed, and among the reduction methods, the reverse micelle method which is capable of readily controlling the particle diameter is particularly preferred.

The metal nanoparticles produced by the liquid phase method may be subjected to the annealing treatment as necessary. For example, in the case of Cu/Au type or $Cu_3Au$ type ferromagnetic ordered alloy, the alloy nanoparticle synthesized according to the aforementioned method has a face centered cubic crystal structure. The face centered cubic crystal usually exhibits soft magnetism or paramagnetism, and those exhibiting soft magnetism or paramagnetism are not suited for recording media. In order to obtain a ferromagnetic ordered alloy having a coercive force of 95.5 kA/m (1200 Oe) or greater, which is required for magnetic recording media, an annealing treatment must be carried out at a temperature equal to or higher than the transformation temperature at which the alloy is transformed from its disordered phase to the ordered phase. However, when the alloy nanoparticles produced according to the above method are applied on a support and subjected to the annealing treatment to produce a magnetic recording medium, the alloy nanoparticles tend to flocculate easily with each other leading to reduced coatability and deteriorated magnetic properties. In addition, due to uneven particle diameter of the resulting alloy nanoparticles, it has been difficult to form a perfect ordered phase even if a heat treatment is executed. Accordingly, there have been cases in which the desired ferromagnetism is not achieved.

As methods of preventing fusion of the metal nanoparticles resulting from annealing, those described in Japanese Patent Application Laid-Open (JP-A) Nos. 2003-132519 and 2003-217108, and Japanese National Phase Publication No. 2003-533363 and the like are known. However, according to these methods, condensation of the metal alkoxide compound used as the shell may proceed excessively, which may cause flocculation of the core/shell particles and generation of particles of the metal alkoxide compound alone as a byproduct.

SUMMARY OF THE INVENTION

The present invention was accomplished in view of the foregoing circumstances. Accordingly, the invention provides a core/shell particle and a method of producing the same.

According to an aspect of the invention, there is provided a core/shell particle including a core component that contains a metal, and a shell component that coats the core component, the shell component including a hydrolysate and/or a partial condensate of a compound represented by the following formula (I).

$$(R)_m\text{—}A(X)_{4-m} \qquad \text{Formula (I)}$$

In formula (I), R represents a substituted or unsubstituted alkyl group, or a substituted or unsubstituted aryl group; A represents Si or Ti; X represents a hydroxyl group or a hydrolyzable group; and m represents an integer of 1 to 3.

According to another aspect of the invention, there is provided a method of producing a core/shell particle including: forming a core component by mixing a reverse micelle solution including a reducing agent with one or more reverse micelle solutions including a metal salt, and carrying out a reduction treatment; and coating the core component with a shell component by adding a reverse micelle solution containing a hydrolysate and/or a partial condensate of a compound represented by the following formula (I) in the form of a sol composition.

$$(R)_m\text{—}A(X)_{4-m} \qquad \text{Formula (I)}$$

In formula (I), R represents a substituted or unsubstituted alkyl group, or a substituted or unsubstituted aryl group; A represents Si or Ti; X represents a hydroxyl group or a hydrolyzable group; and m represents an integer of 1 to 3.

According to another aspect of the invention, there is provided a method of producing a core/shell particle including: forming a core component by mixing a reverse micelle solution including a reducing agent with one or more reverse micelle solutions including a metal salt, and carrying out a reduction treatment; and coating the core component with a shell component by adding a reverse micelle solution containing a compound represented by the following formula (I), and allowing the compound represented by formula (I) to be hydrolyzed and/or partially condensed.

   Formula (I)

In formula (I), R represents a substituted or unsubstituted alkyl group, or a substituted or unsubstituted aryl group; A represents Si or Ti; X represents a hydroxyl group or a hydrolyzable group; and m represents an integer of 1 to 3.

DETAILED DESCRIPTION OF THE INVENTION

Core/Shell Particle

The core/shell particle of the present invention is a particle including a core component that contains a metal, and a shell component that coats the core component. The shell component includes a hydrolysate and/or a partial condensate of a compound represented by the following formula (I).

   Formula (I)

In formula (I), R represents a substituted or unsubstituted alkyl group, or a substituted or unsubstituted aryl group. A represents Si or Ti. X represents a hydroxyl group or a hydrolyzable group. m represents an integer of 1 to 3. Details of R and X are referred to in the section of Method of Producing Core/shell Particles.

The core component of the core/shell particles of the invention may be, for example, Au, Ag, Cu, Pd, Pt, CuO, FeS, $Ag_2S$, CuS, $BaTiO_3$, $SrTiO_3$, ZnO, ZnS, FePt, FePd, CoPt, CoAu, FeNi, FeCo, $Fe_2O_3$ or the like. Among these, FePt, FePd, CoPt, CoAu, FeNi, FeCo, $Fe_2O_3$, and the like are preferable as magnetic materials.

The ratio (A/metal) of A included in the shell component to the metal included in the core component is preferably in the range of 30 to 200%, and more preferably 50 to 100% as represented by the atomic percentage. The ratio falling within the range to be not less than 30% permits the metal nanoparticle surface to be uniformly coated. Also, the ratio to fall within the range to be not greater than 200% can prevent generation of flocculated particles of the shell component compound that are the byproduct.

The above-described ratio of "A/metal" (A represents Si or Ti) can be determined by carrying out element mapping of the particles with an FE-TEM capable of finely contracting electron beams equipped with an EDAX. Moreover, for the evaluation of the particle diameter of the core/shell particles, a transmission electron microscope (TEM) may be used. In order to determine the crystal type of the core/shell particle ferromagnetized by the annealing treatment, electron diffraction by TEM may be used, but X-ray diffraction is preferably used for performing with high accuracy. For analysis of the composition of the ferromagnetized core component, the evaluation may be made with the FE-TEM equipped with an EDAX in a similar manner described above. Evaluation of magnetic property of the ferromagnetized core/shell particle may be made using a vibrating sample magnetometer (VSM).

The presence/absence of the core/shell structure can be ascertained by a TEM. The core component preferably has a particle diameter of 1 to 20 nm. The shell layer including the shell component preferably has a thickness of 1 to 5 nm.

The shell component of the core/shell particle of the invention is highly heat resistant, therefore, the particles hardly fuse even though a heating treatment is carried out. Furthermore, because of having the alkyl group included in the composition of the shell component, it has high affinity to the solvent, and thus dispersibility in the solvent is also favorable.

Hereinafter, the method of producing the core/shell particle of the invention will be explained in detail. Various explanations described below are made based on typical embodiments of the invention, but the invention is not limited to such embodiments.

Method of Producing Core/Shell Particles

The method of producing a core/shell particle of the present invention may be the following method (a) or (b).

Method (a) includes: forming a core component by mixing a reverse micelle solution (1) including a reducing agent with one or more reverse micelle solutions (2) including a metal salt, and carrying out a reduction treatment; and coating the core component with a shell component by adding a reverse micelle solution (3A) containing a hydrolysate and/or a partial condensate of a compound represented by formula (I) described above in the form of a sol composition, following the core forming.

Method (b) includes: forming a core component by mixing a reverse micelle solution (1) including a reducing agent with one or more reverse micelle solutions (2) including a metal salt, and carrying out a reduction treatment; and coating the core component with a shell component by adding a reverse micelle solution (3B) containing a compound represented by formula (I) described above, and allowing the compound represented by formula (I) to be hydrolyzed and/or partially condensed, following the core forming.

Hereinbelow, each process will be explained.

Core Formation

First, the reverse micelle solution (1) is prepared by mixing a water-insoluble organic solvent containing a surfactant with an aqueous reducing agent solution.

An oil-soluble surfactant may be used as the surfactant. Specific examples thereof include sulfonates (e.g., AEROSOL OT produced by Tokyo Chemical Industries, Ltd.), quaternary ammonium salts (e.g., cetyltrimethylammonium bromide), and ethers (e.g., pentaethylene glycol dodecyl ether).

Preferable examples of the water-insoluble organic solvent dissolving the surfactant include alkanes and ethers. An alkane having 7 to 12 carbon atoms is preferable as the water-insoluble organic solvent. Specifically, heptane, octane, nonane, decane, undecane and dodecane are preferable. Diethyl ether, dipropyl ether, and dibutyl ether are included in preferable examples of ethers usable as the water-insoluble organic solvent. The amount of the surfactant in the water-insoluble organic solvent is preferably 20 to 200 g/l.

As the reducing agent in the aqueous reducing agent solution, it is preferable to use one or more selected from alcohols; polyalcohols; $H_2$; HCHO; and compounds containing $S_2O_6^{2-}$, $H_2PO_2^-$, $BH_4^-$, $N_2H_5^+$, $H_2PO_3^-$ and the like. The amount of the reducing agent in the aqueous solution is preferably 3 to 50 mol relative to 1 mol of metal salt.

The mass ratio of water to the surfactant (water/surfactant) in the reverse micelle solution (1) is preferably 20 or lower. When the mass ratio exceeds 20, precipitation easily occurs and the particles tend to be uneven. The mass ratio is preferably 15 or lower and more preferably 0.5 to 10.

Besides the above micelle solution (1), a reverse micelle solution (2) is prepared by mixing a water-insoluble organic solvent containing a surfactant with an aqueous metal salt solution. The conditions of the surfactant and the water-insoluble organic solvent (e.g., materials to be used, concentrations, and the like) are the same as in the case of the reverse micelle solution (1). The conditions similar to or different from the reverse micelle solution (1) may be used.

The components of the reverse micelle solution (2) may be similar to or different from, the components of the reverse micelle solution (1). Further, the mass ratio range of water to the surfactant in the reverse micelle solution (2) may be the same as that in the reverse micelle solution (1), and the mass ratio may be the same as or different from that in the case of the reverse micelle solution (1).

Specific examples of the metal salt contained in the aqueous metal salt solution include $HAuCl_4$, $AgNO_3$, $CH_3COOAg$, $(CH_3COO)_2Cu$, $TiCl_4$, $BaCO_3$, $BaCl_2$, $SrCO_3$, $SrCl_2$, $(CH_3COO)_2Zn$, $ZnSO_4$, $H_2PtCl_6$, $K_2PtCl_4$, $Pt(CH_3COCHCOCH_3)_2$, $Na_2PdCl_4$, $Pd(OCOCH_3)_2$, $PdCl_2$, $Pd(CH_3COCHCOCH_3)_2$, $Fe_2(SO_4)_3$, $Fe(NO_3)_3$, $(NH_4)_3Fe(C_2O_4)_3$, $Fe(CH_3COCHCOCH_3)_3$, $(CH_3COO)_2Fe$, $NiSO_4$, $CoCl_2$, $Co(OCOCH_3)_2$. However, the metal salt which may be used in the invention is not limited to these examples.

The concentration of the aqueous metal salt solution (as the metal salt concentration) is preferably 0.1 to 1000 μmol/ml, and more preferably 1 to 100 μmol/ml.

The reverse micelle solutions (1) and (2) prepared as described above are mixed. Although the mixing method is not particularly limited, in view of uniformity of reduction, mixing is preferably carried out by adding the reverse micelle solution (2) to the reverse micelle solution (1) while stirring the reverse micelle solution (1). A reductive reaction is carried out after the completion of the mixing to form metal-containing cores. The temperature during the reduction is preferably a constant temperature within a range of −5 to 30° C.

When the reduction temperature is lower than −5° C., a problem may arise in that the water phase freezes, thereby resulting in an uneven reductive reaction. When the reduction temperature exceeds 30° C., flocculation or precipitation may easily occur, thereby making the system unstable in some cases. The reduction temperature is more preferably 0 to 25° C. and still more preferably 5 to 25° C.

The foregoing term "constant temperature" means that, when the preset temperature is T(° C.), the real temperature falls in a range of T±3° C. The upper limit and the lower limit of the real reduction temperature have to be within the above-mentioned range of the temperature (−5 to 30° C.). Further, the reverse micelle solution (1) may be added after the mixing.

Although the duration of the core forming process should be properly set depending on the amounts or the like of the reverse micelle solutions, the duration is preferably 1 to 30 minutes and more preferably 5 to 20 minutes.

Since the reduction in the core forming process greatly affects the monodispersibility of the particle diameter distribution, it is preferable to carry out the reduction with stirring at a rate as high as possible. A preferable stirring apparatus may be a stirring apparatus having high shearing force, and may be specifically a stirring apparatus in which: the stirring blade basically has a turbine type or paddle type structure; a sharp edge is attached to the end of the blade or a position where it is in contact with the blade; and the blade is rotated by a motor. Specifically, Dissolver (manufactured by Tokushu Kika Kogyo Co., Ltd.), Omnimixer (manufactured by Yamato Scientific Co., Ltd.), Homogenizer (manufactured by SMT), and the like are useful. By using such an apparatus, monodispersed metal-containing core particles can be produced in the form of a stable dispersion in a liquid.

Coating

Further, separately from the above process, the reverse micelle solution (3A) is prepared by mixing a water-insoluble organic solvent containing a surfactant with a water soluble organic solvent containing the compound represented by the above formula (I) or a hydrolysate or a partial condensate of the compound represented by the above formula (I) in the form of a sol composition. Requirements for the surfactant and the water-insoluble organic solvent (substance used, concentration and the like) are similar to those in the case of the reverse micelle solution (1). The requirements similar to or different from the requirements for the reverse micelle solution (1) can be employed. Alternatively, the core component may be coated with the shell component by adding the reverse micelle solution (3B) containing a compound represented by formula (I) instead of the reverse micelle solution (3A), and allowing the compound represented by formula (I) to be hydrolyzed and/or partially condensed. Hereinafter, the reverse micelle solution (3A) and the reverse micelle solution (3B) may be collectively referred to as "reverse micelle solution (3)"

In formula (I), R represents a substituted or unsubstituted alkyl group, or a substituted or unsubstituted aryl group. X represents a hydroxyl group or a hydrolyzable group, which may be e.g., an alkoxy group (preferably an alkoxy group having 1 to 5 carbon atoms, for example, a methoxy group, an ethoxy group or the like), halogen (for example, chlorine, bromine, iodine or the like), or $R^2COO$, wherein $R^2$ is preferably a hydrogen atom or an alkyl group (for example, $CH_3COO$, $C_2H_5COO$ or the like). X is preferably an alkoxy group, and particularly preferably a methoxy group or an ethoxy group. m represents an integer of 1 to 3. When a plurality of Rs are present, the plurality of Rs may be the same or different. When a plurality of Xs are present, the plurality of Xs may be the same or different. m is preferably 1 or 2, and particularly preferably 1.

The substituent included in R is not particularly limited, but examples thereof include halogen (fluorine, chlorine, bromine and the like), a hydroxyl group, a mercapto group, a carboxyl group, an amino group, an epoxy group, alkyl groups (a methyl group, an ethyl group, an i-propyl group, a propyl group, a tert-butyl group, an octadecyl group and the like), aryl groups (a phenyl group, a naphthyl group and the like), aromatic heterocyclic groups (a furyl group, a pyrazolyl group, a pyridyl group and the like), alkoxy groups (a methoxy group, an ethoxy group, an i-propoxy group, a hexyloxy group and the like), aryloxy groups (a phenoxy group and the like), alkylthio groups (a methylthio group, an ethylthio group and the like), arylthio groups (a phenylthio group and the like), alkenyl groups (a vinyl group, a 1-propenyl group and the like), acyloxy groups (an acetoxy group, an acryloyloxy group, a methacryloyloxy group and the like), alkoxycarbonyl groups (a methoxycarbonyl group, an ethoxycarbonyl group and the like), aryloxycarbonyl groups (a phenoxycarbonyl group and the like), carbamoyl groups (a carbamoyl group, an N-methylcarbamoyl group, an N,N-dimethylcarbamoyl group, an N-methyl-N-octylcarbamoyl group and the like), acylamino groups (an acetylamino group, a benzoylamino group, an acrylamino group, a methacrylamino group and the like), and the like. These substituents may be further substituted.

Two or more of the compounds represented by formula (I) may be used in combination. Specific examples of the compounds represented by formula (I) include vinyl trichlorosilane, vinyl triethoxysilane, vinyl tris(β-methoxy)silane, amino propyl triethoxysilane, amino propyl methoxy diethoxysilane, glycidoxy propyl dimethoxysilane, isopropyl triisostearoyl titanate, isopropyl tridodecyl benzene sulfonyl titanate, isopropyl tris(dioctyl pyrophosphate)titanate, tetraisopropyl bis(dioctyl phosphite)titanate, tetraoctyl bis(ditridecyl phosphite)titanate, tetra(2,2-diallyloxymethyl-1-butyl) bis(ditridecyl)phosphite titante, bis(dioctyl pyrophosphate) oxyacetate titanate, bis(dioctyl pyrophosphate) ethylenetitanate, isopropyl tri(dioctyl phosphate)titanate, isopropyl tricumyl phenyl titanate, isopropyl tri(N-amidoethyl aminoethyl)titanate, and compounds (1) to (41) illustrated below, but the compound which can be used in the invention is not limited thereto.

$$CH_3-Si-(OC_2H_5)_3 \quad (1)$$

$$C_2H_5-Si-(OC_2H_5)_3 \quad (2)$$

$$t\text{-}C_4H_9-Si-(OCH_3)_3 \quad (3)$$

$$C_{18}H_{37}-Si-(OCH_3)_3 \quad (4)$$

(5) PhCH₂—Si—(OCH₃)₃

(6) (epoxide)CH₂—Si—(OCH₃)₃

(7) (epoxide)CH₂OCH₂CH₂CH₂—Si—(OCH₃)₃

(8) (epoxide)CH₂CH₂—Si—(OCH₃)₃

(9) (epoxide)CH₂CH₂CH₂—Si—(OC₂H₅)₃

(10) (oxetane with C₂H₅)CH₂OCH₂CH₂—Si—(OCH₃)₃

(11) (oxetane with C₂H₅)CH₂OCH₂CH₂CH₂—Si—(OC₂H₅)₃

$$C_3F_7CH_2CH_2-Si-(OC_2H_5)_3 \quad (12)$$

$$C_6F_{13}CH_2CH_2-Si-(OC_2H_5)_3 \quad (13)$$

(14) CH₂=CH—CO₂CH₂CH₂CH₂—Si—(OCH₃)₃

(15) CH₂=C(CH₃)—CO₂CH₂CH₂CH₂—Si—(OCH₃)₃

(16) CH₂=CH—CO₂CH₂CH₂—Si—(OCH₃)₃

(17) CH₂=CH—CO₂CH₂CH₂CH₂—Si—(OC₂H₅)₃

(18) CH₂=CH—CH₂CH₂—Si—(OCH₃)₃

(19) (epoxycyclohexyl)—CH₂—Si—(OCH₃)₃

(20) (epoxycyclohexyl)—CH₂CH₂—Si—(OC₂H₅)₃

(21) HO—C(=O)—CH₂CH₂—Si—(OCH₃)₃

(22) NH₂CH₂CH₂CH₂—Si—(OCH₃)₃

(23) HS—CH₂CH₂CH₂—Si—(OCH₃)₃

(24) (epoxycyclohexyl)—CH₂OCH₂CH₂—Si—(OCH₃)₃

(25) CH₂=CH—C₆H₄—CH₂OCH₂CH₂—Si—(OCH₃)₃

$$(CH_3O)_3-Si-CH_2CH_2CH_2CH_2-Si-(OCH_3)_3 \quad (26)$$

$$(CH_3O)_3-Si-CH_2CH_2CH_2CH_2CH_2CH_2-Si-(OCH_3)_3 \quad (27)$$

(28) (CH₃O)₃—Si(CH₃)—CH₂CH₂CH₂CH₂—Si(CH₃)—(OCH₃)₃

(29) CH₂=CH—CONHCH₂CH₂CH₂—Si—(OCH₃)₃

(30) CH₂=C(CH₃)—CONHCH₂CH₂CH₂—Si—(OCH₃)₃

(31) CH₂=CH—CO—N(CH₃)—CH₂CH₂CH₂—Si—(OCH₃)₃

(32) CH₂=CH—CO—NHCH₂CH₂CH₂CH₂—Si—(OCH₃)₃

(33) CH₂=CH—CO—NHCH₂CH₂CH₂—Si(CH₃)—(OCH₃)₂

(34) [(epoxide)—CH₂OCH₂CH₂—]₂Si—(OCH₃)₂

(35) (epoxide)—CH₂OCH₂CH₂—Si(CH₃)—(OCH₃)₂

(36) HO—C(=O)—CH₂CH₂CH₂—Si(CH₃)—(OCH₃)₂

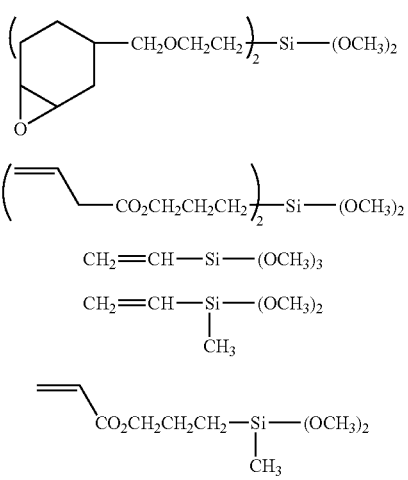

When the compound represented by formula (I) in the reverse micelle solution (3) is included in the form of a sol composition of its hydrolysate and/or its partial condensate, the hydrolysis/condensation reaction of the compound represented by formula (I) can be carried out without a solvent or in a solvent, but it is preferred to use an organic solvent for homogeneously mixing the components. For example, alcohols, aromatic hydrocarbons, ethers, ketones, esters and the like are suited. As the solvent, any one that dissolves the silane compound and the catalyst is preferred. Also, the solvent is preferably used as an application liquid or a part of the application liquid in light of the process performance.

Among these, examples of the alcohols include e.g., monohydric alcohols or dihydric alcohols. Of these, as the monohydric alcohol, saturated aliphatic alcohols having 1 to 8 carbon atoms are preferred. Specific examples of these alcohols include methanol, ethanol, n-propyl alcohol, i-propyl alcohol, n-butyl alcohol, sec-butyl alcohol, tert-butyl alcohol, ethylene glycol, diethylene glycol, triethylene glycol, ethylene glycol monobutyl ether, ethylene glycol acetate monoethyl ether, and the like.

Specific examples of the aromatic hydrocarbons include benzene, toluene, xylene, and the like; specific examples of the ethers include tetrahydrofuran, dioxane, and the like; specific examples of the ketones include acetone, methyl ethyl ketone, methyl isobutyl ketone, diisobutyl ketone, and the like; specific examples of the esters include ethyl acetate, propyl acetate, butyl acetate, propylene carbonate, and the like.

These organic solvents can be used one of them alone, or two or more thereof as a mixture. The concentration of the solid content in the reaction is not particularly limited, but is usually in the range of 1% by mass to 90% by mass, and preferably in the range of 20% by mass to 70% by mass.

When the compound represented by formula (I) in the reverse micelle solution (3) is included in the form of a sol composition of its hydrolysate and/or its partial condensate, it is preferred that the hydrolysis/condensation reaction of the compound represented by formula (I) be carried out in the presence of a catalyst. Examples of the catalyst include inorganic acids such as hydrochloric acid, sulfuric acid and nitric acid; organic acids such as oxalic acid, acetic acid, formic acid, methanesulfonic acid and toluenesulfonic acid; inorganic bases such as sodium hydroxide, potassium hydroxide and ammonia; organic bases such as triethylamine and pyridine; metal alkoxides such as triisopropoxy aluminum and tetrabutoxy zirconium, and the like. In light of production stability of the sol liquid and storage stability of the sol liquid, acid catalysts (inorganic acids, organic acids) are preferred. As the inorganic acid, hydrochloric acid and sulfuric acid are preferred, while as the organic acid one having an acid dissociation constant (pKa value at 25° C.) in water of 4.5 or less is preferred. Hydrochloric acid, sulfuric acid, and organic acids having an acid dissociation constant in water of 3.0 or less are more preferred. Hydrochloric acid, sulfuric acid, and organic acids having an acid dissociation constant in water of 2.5 or less are more preferred, and organic acids having an acid dissociation constant of 2.5 or less are more preferred. Methanesulfonic acid, oxalic acid, phthalic acid and malonic acid are still more preferred, and oxalic acid is particularly preferred.

Hydrolysis/condensation reaction is usually carried out by adding 0.3 to 2 mol, preferably 0.5 to 1 mol of water per 1 mol of the hydrolyzable group of the compound represented by formula (I), and then stirring in the presence or absence of the solvent and preferably in the presence of the catalyst at 25 to 100° C.

When the hydrolyzable group is alkoxide and the catalyst is an organic acid, the amount of added water can be reduced because proton is supplied from the carboxyl group or sulfo group of the organic acid. The amount of added water per 1 mol of the alkoxide group of the compound represented by formula (I) is usually 0 to 2 mol, preferably 0 to 1.5 mol, more preferably 0 to 1 mol, and particularly preferably 0 to 0.5 mol. When the alcohol is used as the solvent, the case in which water is not substantially added is also suitable.

The amount of the catalyst to be used is usually 0.01 to 10 mol % and preferably 0.1 to 5 mol % based on the hydrolyzable group when the catalyst is an inorganic acid. When the catalyst is an organic acid, the amount of the catalyst to be used varies depending on the amount of added water. More specifically, when water is added, the amount is usually 0.01 to 10 mol %, preferably 0.1 to 5 mol % based on the hydrolyzable group, while when water is not substantially added, the amount is usually 1 to 500 mol %, preferably 10 to 200 mol %, more preferably 20 to 200 mol %, still more preferably 50 to 150 mol %, and particularly preferably 50 to 120 mol % based on the hydrolyzable group. The reaction is carried out usually by stirring at 25 to 100° C., but the reaction is preferably controlled ad libitum depending on the reactivity of the compound represented by formula (I).

The sol composition of the hydrolysate and/or the partial condensate of the compound represented by formula (I) is gelled by adsorption on the surface of the metal core formed in the core forming process, and coats the metal core in the form of a gel film.

To a mixture of the reverse micelle solutions (1) and (2) after the completion of the core forming process is added the reverse micelle solution (3) while keep stirring at a high rate in the core forming process. By carrying out the stirring at a high rate, collision frequency between the reverse micelle containing the metal nanoparticles and the reverse micelle containing the compound for forming the shell component is increased, whereby uniform coating is enabled. Insufficient stirring is not preferred because particles may be generated through flocculation of the compound for forming the shell component alone.

It is preferred that after adding the reverse micelle solution (3), at least one dispersant having 1 to 3 amino groups or carboxy groups is added in an amount of 0.001 to 10 mol per 1 mol of the alloy nanoparticle to be produced.

By adding such a dispersant, the core/shell particles that are in a more monodisperse state without flocculation may be obtained. When the amount of addition is less than 0.001 mol, there may be a case in which monodispersibility of the core/shell particles cannot be further improved, while the amount of greater than 10 mol may cause flocculation.

As the aforementioned dispersant, an organic compound having a group adsorbable to the surface of the core/shell particle is preferable. Specific examples of the dispersant include organic compounds having 1 to 3 groups selected from amino groups, carboxyl groups, sulfonic acid groups and sulfinic acid groups. Only a single dispersant may be used, or two or more dispersants may be used in combination.

The dispersant may be, for example, a compound having a structural formula represented by R—NH$_2$, NH$_2$—R—NH$_2$, NH$_2$—R(NH$_2$)—NH$_2$, R—COOOH, COOH—R—COOH, COOH—R(COOH)—COOH, R—SO$_3$H, SO$_3$H—R—SO$_3$H, SO$_3$H—R(SO$_3$H)—SO$_3$H, R—SO$_2$H, SO$_2$H—R—SO$_2$H, or SO$_2$H—R(SO$_2$H)—SO$_2$H, wherein R is a linear, branched or cyclic, saturated or unsaturated hydrocarbon.

Heat Treatment

The coating process preferably includes, after the addition of the reverse micelle solution (3), heating at a temperature higher than the temperature at the core forming process (heat treatment process). The shell component that coats the particles can become harder by the heat treatment. The heat treatment temperature is preferably maintained at a constant temperature which is in a range of 30 to 90° C. The heat treatment time is preferably 5 to 180 minutes. When the heat treatment temperature is higher than the above range or the heat treatment time is longer than the above range, flocculation or precipitation easily occurs. On the contrary, when the temperature is lower than the above range or the time is shorter than the above range, the reaction may not be completed, leading to a change in the composition. The heat treatment temperature is more preferably 40 to 80° C. and still more preferably 40 to 70° C. The heat treatment time is more preferably 10 to 150 minutes and still more preferably 20 to 120 minutes.

The aforementioned term "constant temperature" means that, when the preset temperature is T(° C.), the real temperature falls in a range of T±3° C. Particularly, the heat treatment temperature is higher than the temperature at the core forming process by preferably 5° C. or larger, and more preferably 10° C. or larger provided the heat treatment temperature is within the aforementioned teat treatment temperature range (30 to 90° C.). When the difference between the core forming temperature and the heat treatment temperature is smaller than 5° C., a composition according to the formulation may not be obtained.

After the completion of the coating process, it is preferred to eliminate unreacted metal ion by adding a chelating agent. The state in which the metal ion is left may lead to possibility of producing impurities through reduction of the unreacted metal ion in the washing and dispersion process described later. Specific examples of the chelating agent used in this procedure include ethylenediaminetetraacetic acid, nitrilotriacetic acid, hydroxyethyliminodiacetic acid, hydroxyethylethylenediaminetriacetic acid, diethylenetriaminepentaacetic acid, triethylenetetraminehexaacetic acid, dicarboxymethylglutamic acid tetrasodium salt, N,N-bis(2-hydroxyethyl)glycine, 1,3-propanediaminetetraacetic acid, 1,3-diamino-2-hydroxypropanetetraacetic acid, L-aspartic acid-N,N-diacetic acid, hydroxyethylidenediphosphonic acid, nitrilotris(methylenephosphonic acid), phosphonobutanetriacetic acid, N,N,N',N'-tetrakis(phosphonomethyl)ethylene diamine, and the like.

In an embodiment, after the coating process, the solution after the coating process is washed with a mixed solution of water and a primary alcohol and then precipitation treatment is carried out using a primary alcohol to produce a precipitate, which is then dispersed in an organic solvent. Impurities are removed by providing the washing and dispersing in this embodiment, thereby improving the coatability at the time of forming a layer containing the core/shell particles of the invention by coating. The above washing and the dispersing are respectively carried out at least once and preferably twice or more.

Although there is no particular limitation on the primary alcohol used in the washing step, methanol, ethanol, or the like is preferable. The mixing ratio by volume (water/primary alcohol) is preferably in a range of 10/1 to 2/1 and more preferably in a range of 5/1 to 3/1. If the proportion of water is high, it may be difficult to remove the surfactant. On the contrary, if the proportion of the primary alcohol is high, flocculation may occur.

As in the foregoing, core/shell particles dispersed in the solution can be obtained. The core/shell particles exhibit excellent monodispersibility, hardly flocculate, and may keep the state in which they are uniformly dispersed.

The core/shell particles before annealing have a particle diameter of preferably 1 to 20 nm, and more preferably 3 to 10 nm. The coefficient of variation of the particle diameter of the core/shell particle of the invention is preferably less than 10%, and more preferably 5% or less.

Annealing Treatment

In the method of producing a core/shell particle of the invention, it is preferable to subject to the annealing treatment after the coating process. The method for heating in the annealing treatment is not particularly limited. The annealing can be carried out by any of a method of heating after applying on the support, a method of heating by an autoclave in the state of a dispersion, a method of treating in a heating furnace following evaporation of the solvent to give the powder, and the like, but the invention is not limited thereto.

The core/shell particle of the invention after subjecting to the annealing treatment is preferably magnetic. In this case, the core/shell particle preferably has a coercive force of preferably 95.5 to 636.8 kA/m (1200 to 8000 Oe), and more preferably 95.5 to 398 kA/m (1200 to 5000 Oe) when applied to a magnetic recording medium in light of possible adapting to the recording head.

EXAMPLES

The present invention will now be described with reference to Examples. However, the Examples should not be construed as limiting the invention.

Synthesis of Sol Composition

Preparation of Organosilane Sol Composition A

To a reactor equipped with a stirrer and a reflux condenser, 48 g of acryloyloxypropyltrimethoxysilane (Compound (14)), 37 g of oxalic acid, and 124 g of ethanol were added and mixed. After the mixing, hydrolysis was conducted by allowing the reaction at 70° C. for 5 hrs, followed by cooling to room temperature. Accordingly, a sol composition A in which the silane compound was partially condensed was obtained.

Preparation of Organosilane Sol Composition B

To a reactor equipped with a stirrer and a reflux condenser, 48 g of acryloyloxypropyltrimethoxysilane, 0.84 g of aluminum diisopropoxide ethylacetoacetate, 60 g of methyl ethyl ketone, 0.06 g of hydroquinonemonomethyl ether, and 11.1 g of water were added and mixed. After the mixing, hydrolysis was conducted by allowing a reaction at 60° C. for 4 hrs, followed by cooling to room temperature. Accordingly, a transparent sol composition B in which the silane compound was partially condensed was obtained.

Preparation of Organosilane Sol Composition C

A transparent sol composition C in which the silane compound was partially condensed was obtained by a similar manipulation to the preparation of the sol composition B except that acryloyloxypropyltrimethoxysilane was replaced with methacryloyloxypropyltrimethoxysilane (Compound (15)) in the preparation of the sol composition B.

Preparation of Organosilane Sol Composition D

A transparent sol composition D in which the silane compound was partially condensed was obtained by a similar manipulation to the preparation of the sol composition B except that acryloyloxypropyltrimethoxysilane was replaced with tetraethoxysilane in the preparation of the sol composition B.

Example 1

Synthesis of Core/Shell Particle

The following operation was performed in a highly purified $N_2$ gas.

To an aqueous reducing agent solution in which 0.48 g of $NaBH_4$ (produced by Wako Pure Chemical Industries, Ltd.) is dissolved in 18 ml of $H_2O$ (deoxygenated) was added an alkane solution prepared by dissolving 12.4 g of AEROSOL OT (produced by Tokyo Chemical Industries, Ltd.) in 120 ml of decane (produced by Wako Pure Chemical Industries, Ltd.), which was mixed to prepare a reverse micelle solution (1).

To an aqueous metal salt solution prepared by dissolving 0.44 g of ammonium ferric trioxalate $(Fe(NH_4)_3(C_2O_4)_3$ (produced by Wako Pure Chemical Industries, Ltd.) and 0.41 g of potassium chloroplatinate ($K_2PtCl_4$) (produced by Wako Pure Chemical Industries, Ltd.) in 18 ml of $H_2O$ (deoxygenated) was added an alkane solution prepared by dissolving 12.4 g of AEROSOL OT in 120 ml of decane, which was mixed to prepare a reverse micelle solution (2).

To an aqueous reducing agent solution in which 0.12 g of $NaBH_4$ (produced by Wako Pure Chemical Industries, Ltd.) is dissolved in 4.5 ml of $H_2O$ (deoxygenated) was added an alkane solution prepared by dissolving 3.1 g of AEROSOL OT in 30 ml of decane, which was mixed to prepare a reverse micelle solution (2)'.

To a solution prepared by dissolving 0.77 ml of a 22.9% methyl ethyl ketone dispersion of the sol composition A in 3.73 ml of ethoxyethanol was added an alkane solution prepared by dissolving 3.1 g of AEROSOL OT in 30 ml of decane, which was mixed to prepare a reverse micelle solution (3).

To an aqueous solution prepared by dissolving 0.01 g of BICINE (N,N-bis(2-hydroxyethyl)glycine; produced by Dojindo Laboratories) in 4.5 ml of $H_2O$ (deoxygenated) was added the alkane solution prepared by dissolving 3.1 g of AEROSOL OT in 30 ml of decane, which was mixed to prepare a reverse micelle solution (4).

The reverse micelle solution (2) was added at once to the reverse micelle solution (1) at 22° C. while stirring at a high rate using an Omnimixer (manufactured by Yamato Scientific Co., Ltd.) (core forming process). Four minutes later, the reverse micelle solution (2)' was added at once. In additional 6 minutes, the reverse micelle solution (3) was added at once (coating process). In additional 2 minutes, 3 ml of oleylamine was added at once. Two minutes thereafter, stirring apparatus was changed to a magnetic stirrer, and the temperature was elevated to 40° C. and kept for 110 minutes (heat treatment process), and thereto was added the reverse micelle solution (4) at once, followed by further stirring for 10 min.

After cooling to room temperature, 3 ml of oleic acid (produced by Wako Pure Chemical Industries, Ltd.) was added, and mixed. The mixture was removed into the ambient air. For disrupting the reverse micelle, a mixed solution of 450 ml of $H_2O$ and 450 ml of methanol was added thereto, and the mixture was separated into an aqueous phase and an oil phase. The core/shell particles before subjecting to the annealing treatment were obtained in the oil phase in a dispersed state. The oil phase was recovered, and washed once with a mixture of 900 ml of $H_2O$ and 300 ml of methanol. Thereafter, 300 ml of ethanol was added thereto and centrifugal separation was carried out under a condition of 3000 rpm for 10 min with a centrifugal separator to allow the metal nanoparticles to be precipitated. The supernatant was eliminated, and 40 ml of heptane (produced by Wako Pure Chemical Industries, Ltd.) was added thereto followed by redispersion. Furthermore, 40 ml of ethanol was added, and then precipitation by centrifugal separation and dispersion in 40 ml of heptane were repeated twice. Finally, 15 ml of heptane was added to obtain a liquid containing the core/shell particles before subjecting to the annealing treatment. The alloy composition was Fe/Pt=55/45% (atomic percentage).

Example 2

A liquid containing the core/shell particles before subjecting to the annealing treatment was obtained by a similar manipulation to Example 1 except that the sol composition A was replaced with the sol composition B.

Example 3

A liquid containing the core/shell particles before subjecting to the annealing treatment was obtained by a similar manipulation to Example 1 except that the sol composition A was replaced with the sol composition C.

Example 4

A liquid containing the core/shell particles before subjecting to the annealing treatment was obtained by a similar manipulation to Example 1 except that the reverse micelle solution (3) was changed to include 0.46 ml of the sol composition A and 3.54 ml of ethoxyethanol.

Example 5

A liquid containing the core/shell particles before subjecting to the annealing treatment was obtained by a similar manipulation to Example 1 except that the reverse micelle solution (3) was changed to include 3.08 ml of the sol composition A and 0.92 ml of ethoxyethanol.

Example 6

A liquid containing the core/shell particles before subjecting to the annealing treatment was obtained by a similar manipulation to Example 1 except that the reverse micelle solution (3) was changed to include 0.15 ml of the sol composition A and 3.85 ml of ethoxyethanol.

Example 7

A liquid containing the core/shell particles before subjecting to the annealing treatment was obtained by a similar manipulation to Example 1 except that the reverse micelle solution (3) was changed to include 0.30 ml of the sol composition A and 3.70 ml of ethoxyethanol.

Example 8

A liquid containing the core/shell particles before subjecting to the annealing treatment was obtained by a similar manipulation to Example 1 except that the reverse micelle solution (3) was changed to include 3.85 ml of the sol composition A and 0.15 ml of ethoxyethanol.

Example 9

A liquid containing the core/shell particles before subjecting to the annealing treatment was obtained by a similar manipulation to Example 1 except that in the reverse micelle solution (3), sol composition A was changed to 0.75 g of octadecyl trimethoxysilane and ethoxyethanol was changed to 4.5 ml of hexanol.

Example 10

A liquid containing the core/shell particles before subjecting to the annealing treatment was obtained by a similar manipulation to Example 1 except that in the reverse micelle solution (3), sol composition A was changed to 1.88 g of isopropyl triisostearoyl titanate and ethoxyethanol was changed to 4.5 ml of hexanol.

Example 11

A liquid containing the core/shell particles before subjecting to the annealing treatment was obtained by a similar manipulation to Example 1 except that in the reverse micelle solution (3), sol composition A was changed to 0.36 g of aminopropyl trimethoxysilane and ethoxyethanol was changed to 4.5 ml of hexanol.

Example 12

A liquid containing the core/shell particles before subjecting to the annealing treatment was obtained by a similar manipulation to Example 1 except that in the reverse micelle solution (2) 0.41 g of potassium chloroplatinate ($K_2PtCl_4$) (produced by Wako Pure Chemical Industries, Ltd.) was not added, and after the temperature was elevated to 40° C., 10 ml of 1N NaOH was added.

Example 13

A liquid containing the core/shell particles before subjecting to the annealing treatment was obtained by a similar manipulation to Example 1 except that the metal salt contained in the reverse micelle solution (2) was changed to 0.796 g of sodium chloroaurate (NaAu $Cl_4$) (produced by Wako Pure Chemical Industries, Ltd.).

Comparative Example 1

A liquid containing the core/shell particles before subjecting to the annealing treatment was obtained by a similar manipulation to Example 1 except that the sol composition A was replaced with the sol composition D.

Comparative Example 2

A liquid containing the alloy particles before subjecting to the annealing treatment was obtained by a similar manipulation to Example 1 except that the sol composition was not added.

Each of the liquid containing the core/shell particles before subjecting to the annealing treatment produced in Examples 1 to 13 and Comparative Examples 1 and 2 (the liquid containing the alloy particles in Comparative Example 2) was applied on a glass substrate as a support with spin coating. Thereafter, drying was conducted in the air at 250° C., followed by carrying out an annealing treatment in an atmosphere of $N_2+H_2$ (5%) in an infrared heating furnace at 500° C. for 30 min to form a layer including the core/shell particles (layer including the metal particles in Comparative Example 2).

Moreover, ratio of the metal included in the core component and Si or Ti included in the shell component (Si or Ti/metal) was determined by carrying out element mapping with a transmission electron microscope HF-2200 manufactured by Hitachi High-Technologies Corporation. The results are shown in Table 1 below.

TABLE 1

| Sample name | Inclusion in reverse micell solution (3) | Core particle | Constituent ratio of SI to magnetic alloy (% atomic percentage) | Average particle diameter before annealing (nm) | Coefficient variation of particle diameter before annealing | Average particle diameter after annealing (nm) | Coefficient variation of particle diameter after annealing |
|---|---|---|---|---|---|---|---|
| Example 1 | Sol composition A | FePt | 50 | 5.5 | 9.8 | 5.5 | 9.9 |
| Example 2 | Sol composition B | FePt | 50 | 5.7 | 10.1 | 5.7 | 10.1 |
| Example 3 | Sol composition C | FePt | 50 | 5.5 | 9.7 | 5.6 | 9.8 |
| Example 4 | Sol composition A | FePt | 30 | 5.3 | 9.8 | 5.3 | 9.8 |
| Example 5 | Sol composition A | FePt | 200 | 7.5 | 10.2 | 7.5 | 10.3 |
| Example 6 | Sol composition A | FePt | 10 | 5.2 | 9.9 | 13.6 | 22.4 |
| Example 7 | Sol composition A | FePt | 20 | 5.5 | 10.0 | 7.6 | 15.7 |

TABLE 1-continued

| Sample name | Inclusion in reverse micell solution (3) | Core particle | Constituent ratio of SI to magnetic alloy (% (atomic percentage) | Average particle diameter before annealing (nm) | Coefficient variation of particle diameter before annealing | Average particle diameter after annealing (nm) | Coefficient variation of particle diameter after annealing |
|---|---|---|---|---|---|---|---|
| Example 8 | Sol composition A | FePt | 250 | 7.7 | 10.3 | 7.8 | 10.4 |
| Example 9 | Octadecyl trimethoxysilane | FePt | 50 | 5.5 | 9.9 | 5.6 | 10.0 |
| Example 10 | Isopropyl triisostearoyl titanate | FePt | 50 | 5.3 | 9.8 | 5.3 | 10.0 |
| Example 11 | Aminopropyl trimethoxy silane | FePt | 50 | 5.4 | 9.9 | 5.5 | 9.9 |
| Example 12 | Sol composition A | $Fe_2O_3$ | 50 | 6.0 | 10.2 | 6.1 | 10.2 |
| Example 13 | Sol composition A | Au | 50 | 5.7 | 10.0 | 5.7 | 10.1 |
| Comparative Example 1 | Sol composition D | FePt | 50 | 5.7 | 10.3 | 23.5 | 28.5 |
| Comparative Example 2 | None | FePt | 0 | 5.4 | 10.0 | 20.4 | 30.2 |

The coefficient of variation of the average particle diameter (volume average particle diameter) in the above Table 1 were determined with an image processing software KS300 manufactured by Carl Zeiss Inc., by performing image processing of the TEM photograph for observation of the core/shell particles.

Moreover, each shape of the core/shell particles or magnetic particles after subjecting to the annealing treatment obtained in Examples 1 to 13 and Comparative Examples 1 and 2 was observed with a transmission electron microscope 1200EX manufactured by JEOL Ltd. Accordingly, it was shown that a shell layer resulting from the compound represented by formula (I) was formed around the core component including a metal as for the core/shell particles of Examples 1 to 13 and Comparative Example 1.

In Examples 1 to 13, change in the coefficient of variation of the particle diameter was very small. This effect was significant in Examples 1 to 5 and 9 to 13, in which the composition ratio of Si or Ti to the metal is in a range of 30 to 200% (atomic percentage). To the contrary, fusion of the shell layers was found in Comparative Example 1, while fusion of the metal nanoparticles was found and thus the particle diameter could not be satisfactorily kept in Comparative Example 2.

The core/shell particles or magnetic particles were scraped from the layer formed on the support in Examples 1 to 11, and evaluation on each of magnetic property was made. The evaluation of the magnetic property (measurement of coercive force) was made using a highly sensitive magnetization vector measuring instrument and a DATA processing unit, both manufactured by Toei Industry Co., Ltd., under a condition to provide an applied magnetic field of 790 kA/m (10 kOe). The results are shown in Table 2.

TABLE 2

| Sample name | Coercive force Hc (kA/m) |
|---|---|
| Example 1 | 223 (2800 Oe) |
| Example 2 | 239 (3000 Oe) |
| Example 3 | 235 (2950 Oe) |
| Example 4 | 231 (2900 Oe) |
| Example 5 | 240 (3015 Oe) |
| Example 6 | 227 (2850 Oe) |
| Example 7 | 223 (2800 Oe) |
| Example 8 | 215 (2700 Oe) |
| Example 9 | 239 (3000 Oe) |

TABLE 2-continued

| Sample name | Coercive force Hc (kA/m) |
|---|---|
| Example 10 | 220 (2750 Oe) |
| Example 11 | 221 (2775 Oe) |

The core/shell particles of the present invention exhibited the magnetic property as shown in Table 2 and it was shown that the core/shell parties of the present invention was applicable to a magnetic recording medium.

According to the present invention, core/shell particles hardly accompanied by fusion resulting from the annealing treatment and hardly accompanied by flocculation even after coating of the shell component, and a method of producing the same can be provided.

Hereinafter, embodiments of the invention will be described. However, the invention is not limited to these embodiments.

[1] A core/shell particle comprising a core component that contains a metal, and a shell component that coats the core component, the shell component including a hydrolysate and/or a partial condensate of a compound represented by the following formula (I):

$(R)_m$—$A(X)_{4-m}$     Formula (I)

wherein in formula (I), R represents a substituted or unsubstituted alkyl group, or a substituted or unsubstituted aryl group; A represents Si or Ti; X represents a hydroxyl group or a hydrolyzable group; and m represents an integer of 1 to 3.

[2] The core/shell particle as described in [1], wherein a ratio (A/metal) of A included in the shell component to the metal included in the core component is in a range of 30 to 200% in terms of the atomic percentage.

[3] The core/shell particle as described in [1], the core/shell particle being magnetic.

[4] The core/shell particle as described in [1], wherein the core component comprises a ferromagnetic ordered alloy phase of at least one of a CuAu type (CuAu form) or a $Cu_3Au$ type ($Cu_3Au$ form).

[5] The core/shell particle as described in [1], wherein a ratio (A/metal) of A included in the shell component to the metal included in the core component is in a range of 50 to 100% in terms of the atomic percentage.

[6] The core/shell particle as described in [1], wherein the core component has a particle diameter of 1 to 20 nm.

[7] The core/shell particle as described in [1], wherein in formula (I), X is an alkoxy group.

[8] The core/shell particle as described in [1], wherein in formula (I), m is 1 or 2.

[9] The core/shell particle as described in [1], wherein in formula (I), m is 2 or 3; and at least one R is a substituted alkyl group or a substituted aryl group.

[10] The core/shell particle as described in [1], wherein in formula (I), A represents Si.

[11] A method of producing a core/shell particle comprising:

forming a core component by mixing a reverse micelle solution including a reducing agent with one or more reverse micelle solutions including a metal salt, and carrying out a reduction treatment; and coating the core component with a shell component by adding a reverse micelle solution containing a hydrolysate and/or a partial condensate of a compound represented by the following formula (I) in the form of a sol composition:

$(R)_m—A(X)_{4-m}$  Formula (I)

wherein in formula (I), R represents a substituted or unsubstituted alkyl group, or a substituted or unsubstituted aryl group; A represents Si or Ti; X represents a hydroxyl group or a hydrolyzable group; and m represents an integer of 1 to 3.

[12] The method of producing a core/shell particle as described in [11], wherein the coating includes, after the addition of the reverse micelle solution containing the hydrolysate or the partial condensate of the compound represented by formula (I), heating at a temperature higher than the temperature at the core forming.

[13] The method of producing a core/shell particle as described in [11], further comprising annealing after the coating.

[14] A method of producing a core/shell particle comprising:

forming a core component by mixing a reverse micelle solution including a reducing agent with one or more reverse micelle solutions including a metal salt, and carrying out a reduction treatment; and coating the core component with a shell component by adding a reverse micelle solution containing a compound represented by the following formula (I), and allowing the compound represented by formula (I) to be hydrolyzed and/or partially condensed:

$(R)_m—A(X)_{4-m}$  Formula (I)

wherein in formula (I), R represents a substituted or unsubstituted alkyl group, or a substituted or unsubstituted aryl group; A represents Si or Ti; X represents a hydroxyl group or a hydrolyzable group; and m represents an integer of 1 to 3.

[15] The method of producing a core/shell particle as described in [14], wherein the coating includes, after the addition of the reverse micelle solution containing the compound represented by formula (I), heating at a temperature higher than the temperature at the core forming.

[16] The method of producing a core/shell particle as described in [14], further comprising annealing after the coating.

All publications, patent applications, and technical standards mentioned in this specification are herein incorporated by reference to the same extent as if each individual publication, patent application, or technical standard was specifically and individually indicated to be incorporated by reference.

What is claimed is:

1. A method of producing a core/shell particle comprising:
forming a core component by mixing a reverse micelle solution (1) including a reducing agent with one or more reverse micelle solutions (2) including a metal salt, and carrying out a reduction treatment at a temperature in the range of from −5° C. to 30° C.;
coating the core component with a shell component by adding a reverse micelle solution (3a) containing a hydrolysate and/or a partial condensate of a compound represented by the following formula (I) in the form of a sol composition, wherein the coating step further includes, after the addition of the reverse micelle solution (3a) containing the hydrolysate and/or the partial condensate of the compound represented by formula (I), heating at a temperature in the range of from 30° C. to 90° C.; and
annealing after the coating;

$(R)_m—A(X)_{4-m}$  Formula (I)

wherein in formula (I), R represents a substituted or unsubstituted alkyl group, or a substituted or unsubstituted aryl group; A represents Si or Ti; X represents a hydroxyl group or a hydrolyzable group; and m represents an integer of 1 to 3.

2. A method of producing a core/shell particle comprising:
forming a core component by mixing a reverse micelle solution (1) including a reducing agent with one or more reverse micelle solutions (2) including a metal salt, and carrying out a reduction treatment at a temperature in a range of from −5° C. to 30° C.;
coating the core component with a shell component by adding a reverse micelle solution (3b) containing a compound represented by the following formula (I), and allowing the compound represented by formula (I) to be hydrolyzed and/or partially condensed, wherein the coating step further includes, after the addition of the reverse micelle solution (3b) containing the compound represented by formula (I), heating at a temperature in the range of from 30° C. to 90° C.; and
annealing after the coating;

$(R)_m—A(X)_{4-m}$  Formula (I)

wherein in formula (I), R represents a substituted or unsubstituted alkyl group, or a substituted or unsubstituted aryl group; A represents Si or Ti; X represents a hydroxyl group or a hydrolyzable group; and m represents an integer of 1 to 3.

* * * * *